United States Patent [19]

Podilchuk et al.

[11] Patent Number: 5,802,208
[45] Date of Patent: Sep. 1, 1998

[54] FACE RECOGNITION USING DCT-BASED FEATURE VECTORS

[75] Inventors: Christine Irene Podilchuk, Bridgewater; Xiaoyu Zhang, Piscataway, both of N.J.

[73] Assignee: Lucent Technologies Inc., Murray Hill, N.J.

[21] Appl. No.: 643,685

[22] Filed: May 6, 1996

[51] Int. Cl.$^6$ .............................. G06K 9/62; G06K 9/00; G06K 9/46; G06K 9/36
[52] U.S. Cl. ..................... 382/224; 382/115; 382/253; 382/250
[58] Field of Search ................................. 382/115, 253, 382/250, 118, 224

[56] References Cited

PUBLICATIONS

Allen Gersho and Robert M. Gray Vector quantization and signal compression, 1992, pp. 309, 310, 393, 424, 425, Kluwer Academic Publishers, Boston/Dardrecht/London.
Lawrence Rabiner and Biing–Hwang Tuang, Fundamentals of Speech Recognition, 1993, pp. 122–125, 245, 246, Prentice Hall PTR, Englewood Cliffs, New Jersey.

Primary Examiner—Leo H. Boudreau
Assistant Examiner—Dmitry A. Novik
Attorney, Agent, or Firm—Kenneth M. Brown

[57] ABSTRACT

A method and apparatus for recognition of objects such as faces in images using signal compression techniques (i.e., coding techniques) in which a portion of the image which includes the object to be recognized (e.g., the face) is coded, and the resultant coded data is matched against previously coded and stored training data which makes up a known object database. A given object in an input image signal is matched to one of a plurality of known objects stored in a database, wherein the stored representation of each of the known objects comprises a codebook generated based on training image signals comprising the known object. A first illustrative embodiment comprises the steps of decomposing the given object into blocks; performing a plurality of encodings of the given object, each encoding comprising coding the object with use of one of the codebooks; determining a coding error for each encoding; and matching the given object to one of the known objects based on the coding errors. A second illustrative embodiment comprises the steps of decomposing the given object into blocks; generating a codebook corresponding to the given object based on the blocks; comparing the codebook corresponding to the given object with the codebooks corresponding to each of the known objects; and matching the given object to one of the known objects based on the comparison of the codebooks.

18 Claims, 2 Drawing Sheets

FACE RECOGNITION USING DCT-BASED FEATURE VECTORS

FIELD OF THE INVENTION

The present invention relates generally to the field of automated image analysis and in particular to the problem of recognizing and identifying human faces contained therein.

BACKGROUND OF THE INVENTION

Recognition of faces from still images or video data, including verification and identification thereof, has a wide range of commercial applications including video indexing of large databases, security access and numerous other multimedia applications. The face recognition problem can be described generally as follows: Given a still image or a video sequence as input, the required task is to identify one or more persons in the input image(s) based, for example, on the contents of a previously stored database of faces. A high quality face recognition system should be able to match an input or test image to the stored database even when there are variations in lighting, background, facial expression, position, scale, or even when there are changes in hairstyles between the input image and the training image(s) upon which the database is based.

The face identification problem in particular requires that the system perform a one-to-many mapping, determining whether the person in the input image matches the data for any of the individuals contained in the stored database, and, if so, which one. The face authentication problem, on the other hand, requires that the system perform a one-to-one mapping, determining whether the input image (adequately) matches the data for one particular individual in the database—typically, the data for the individual whose identity is claimed by the person using the system. Face authentication has applications in the security field, while face identification has applications in security as well as in fields such as newspaper reporting where it may be desirable to retrieve images of particular individuals from large multimedia databases.

A typical face recognition system consists of three parts—a preprocessing step to segment the data and extract critical areas or features, a feature selection step, and a classification step. The preprocessing step may, for example, consist of a rough segmentation of the input image to isolate the face data from the background data, or it may comprise a more detailed segmentation in order to locate facial parts such as the eyes, nose and mouth which may then be used to generate the features. The preprocessing step may also extract feature vectors such as the geometrical relationships between the facial parts. In any event, once the preprocessing is done, the area-of-interest, i.e., the face, has typically been extracted from the rest of the image and normalized (in size and position). Since such preprocessing is conventional and well known to those of ordinary skill in the art, the remainder of the discussion herein will focus on the feature extraction and classification portions of the face recognition process.

Several techniques for face recognition have been used and/or proposed which are based on extracting critical facial parts or determining a geometric relationship between particular facial parts, and using these as the identifying features to be matched against a database. Unfortunately, these methods typically depend on the ability to locate the facial parts with very high accuracy. This can become very difficult if the images are not captured in a very controlled environment. Moreover, most of these techniques rely on the accurate detection of edges in the images, a local operation which is not particularly robust to changes in lighting or to poor quality images with a significant amount of noise therein.

Techniques which attempt to measure geometric relationships between facial parts such as, for example, the distance between the eyes, the width of the mouth, the distance from an eye to the nose, or the distance from an eye to the mouth, and then attempt to use these parameters as the features against which the data is matched between the input (i.e., test) image data and the training data (i.e., the data stored in the database) include, for example, R. Brunelli and T. Poggio, "Face Recognition through Geometrical Features," Proc. Europe. Conf. on Computer Vision, pp. 792–800, 1992.

Techniques which, on the other hand, do not depend on locating facial parts for the feature selection process include, for example, L. Sirovich and M. Kirby, "Low-Dimensional Procedure for the Characterization of Human Face," J. Opt. Soc. Amer., vol 4, pp. 519–524, 1987, which uses the well known Karhunen-Loeve transform for face recognition, and M. A. Turk and A. P. Pentland, "Face Recognition Using Eigenfaces," Proc. Int. Conf. on Patt. Recog., pp. 586–591, 1991, which defines and uses "eigenfaces" for face detection and recognition. In each of these approaches, each person's face is essentially represented as a vector of weights applied to a predefined set of "eigenfaces." One weakness of this particular approach is that if the input image is not similar to the images which were collected to compute the "eigenface" in terms of scale and head position, the recognition rates drop dramatically.

Finally, neural networks have also been used for face recognition. The neural network approach, however, typically requires a great deal of training data (e.g., several hundred images for each person in the database), thus making such an approach impractical for a large database. Each of the above described prior art approaches as well as others are described in R. Chellappa, C. L. Wilson and S. Sirohey, "Human and Machine Recognition of Faces: A Survey," Proceedings of the IEEE, May, 1995.

SUMMARY OF THE INVENTION

The present invention advantageously employs a signal processing approach which takes advantage of general image statistics, without incorporating any a priori knowledge of characteristics specific to facial image data. This, of course, is in contrast to the prior art "computer vision" approaches described above which are, for the most part, based on heuristics and are, in general, not particularly robust to a wide range of input image variations. Specifically, in accordance with the present invention, recognition of objects such as faces in images is achieved using signal compression techniques (i.e., coding techniques) in which a portion of the image which includes the object to be recognized (e.g., the face) is coded, and the resultant coded data is matched against previously coded training data which is stored in a known object database. By using image compression techniques, each object (e.g., person's face) can be advantageously represented by a small set of numbers.

In accordance with certain illustrative embodiments of the present invention, for example, a portion of an input image which includes an object (e.g., a face) is decomposed into blocks of pixel data, a (linear) transform such as, for example, a Discrete Cosine Transform (DCT) is performed on the pixel data of each block, and the transformed blocks are "vector quantized" (VQ) to produce a codebook of codevectors for each person. (The block-based transform has the effect of advantageously compacting the signal energy of the block into a few significant transform coefficients, which coefficients can then be advantageously used to represent the block. The transform coefficients representing each block of data in the training set may be used to generate a codebook of codevectors.) Generally, the number of input vectors may be much greater than the number of codevectors stored in the codebook—thus, the amount of data needed to represent the training data may be advantageously compressed even further.

Block-based transforms (including DCT) and vector quantization (VQ) are both well known techniques commonly used in the field of image coding and fully familiar to those of ordinary skill in the art. Discrete Cosine Transforms are described, for example, in N. Ahmed, T. Natarajan and K. Rao, "Discrete Cosine Transform," IEEE Trans. Comput., vol 23, pp. 90–93, 1974 and vector quantization is described, for example, in Y. Linde, A. Buzo and R. M. Gray, "An Algorithm for Vector Quantizer Design," IEEE Trans. Commun., COM-28, pp. 84–95, 1990. One illustrative technique which may be advantageously used to generate the codebook codevectors from the training data is known as "k-means clustering," also familiar to those of ordinary skill in the art and described, for example, in S. P. Lloyd, "Least Squares Quantization in PCM," IEEE Trans. Inform. Theory, IT-28, pp. 127–135, 1982. "Discrete Cosine Transform," "An Algorithm for Vector Quantizer Design" and "Least Squares Quantization in PCM" are each hereby incorporated by reference as if fully set forth herein.

In accordance with certain illustrative embodiments of the present invention, a given object in an input image signal is matched to one of a plurality of known objects stored in a database, wherein the stored representation of each of the known objects comprises a codebook generated based on training image signals comprising the known object. A first illustrative embodiment comprises the steps of decomposing the given object into blocks; performing a plurality of encodings of the given object, each encoding comprising coding the object with use of one of the codebooks; determining a coding error for each encoding; and matching the given object to one of the known objects based on the coding errors. A second illustrative embodiment comprises the steps of decomposing the given object into blocks; generating a codebook corresponding to the given object based on the blocks; comparing the codebook corresponding to the given object with the codebooks corresponding to each of the known objects; and matching the given object to one of the known objects based on the comparison of the codebooks.

DETAILED DESCRIPTION

Figure 1:
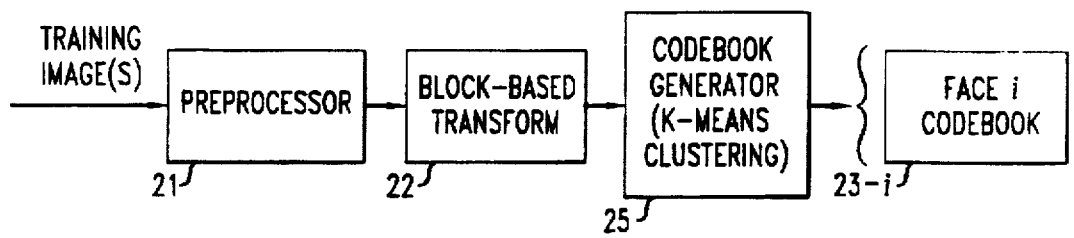
FIG. 1 shows an overview of a database generation process whereby the data for a known face is constructed in accordance with an illustrative embodiment of the present invention.

FIG. 1 shows an overview of a database generation process whereby the data for a known face is constructed in accordance with an illustrative embodiment of the present invention. Several different training images, each comprising a different "picture" of a known individual's face, may be advantageously provided to the process of FIG. 1, thereby resulting in the generation of a codebook which will more completely reflect images of the given known face under different conditions such as different lighting, background, facial expression, position, scale, etc. In particular, the process of FIG. 1 is advantageously repeated for each person whose face is to be included in the database —thus, a different codebook is generated by the process of FIG. 1 for each different person in the training set. As shown in the figure, one or more training images (each containing an image of the face of the i'th person in the training set) are processed, resulting in codebook 23-i which contains a set of codevectors for that one particular person.

Referring to the figure, first (as described above), preprocessor 21 extracts the region of interest (i.e., the face) from the input image, and normalizes the scale thereof. Thus, all further processing can be advantageously performed on the face (and only on the face), and all faces presented to the system will be of the same scale (i.e., size). The preprocessing performed by preprocessor 21 is conventional and well known to those skilled in the art.

After the preprocessing has been completed, the extracted portion(s) of the image(s) are decomposed into blocks, and a linear, block-based transform is performed by transform 22 on each block. The blocks may, for example, comprise an area of size 8×8 (i.e., a square of dimension 8 pixels by 8 pixels), or, alternatively, they may be of size 16×16. The blocks may be contiguous across the image space or, preferably, they may be overlapping (e.g., by 2 pixels in each dimension). By applying a linear transform operator to the original signal, a more efficient representation is obtained wherein the data is statistically independent (or at least uncorrelated). Moreover, a linear transform may also provide substantial energy compaction, a generally desirable property in all signal compression techniques. One commonly used transform in the field of image data compression is the two-dimensional discrete cosine transform (DCT), well known to those of ordinary skill in the art. The DCT provides each of the above-mentioned advantages, and is currently the building block for all international compression standards for both still images and video.

By performing the transformation of transform 22 to each of the image blocks, each of these blocks can be advantageously represented by just a few DCT coefficients. In particular, transform 22 provides only the (L) coefficients with the greatest signal energy content out of the (B×B) coefficients which result from the transformation of the (B×B) block. Where the block size is 8×8 (i.e., B=8), for example, L=8 DCT coefficients may be advantageously provided; where the block size is 16×16 (i.e., B=16), for example, L=16 DCT coefficients may be advantageously provided. As is well known to those of ordinary skill in the art, the DCT coefficients with the greatest signal energy content typically correspond to the low frequency coefficients.

The (generated and provided) DCT coefficients for each block in the training data are assembled into a corresponding vector, and the resultant set of vectors are then used by codebook generator 25 to design a VQ codebook. This codebook will thereby contain the data which represents the face of the given known individual in the database. Note that the number of codebook vectors is typically much smaller than the total number of (DCT) vectors from which it is generated. For example, more than a thousand input vectors may be advantageously provided to codebook generator 25, and these may be mapped into a codebook containing less than 100 (e.g., 64) codebook vectors (i.e., codevectors). The codebook design performed by codebook generator 25 may, for example, comprise the well known "k-means clustering" technique, or other conventional techniques for designing codebooks from training vector data as are well known in the field of signal compression.

Figure 3:
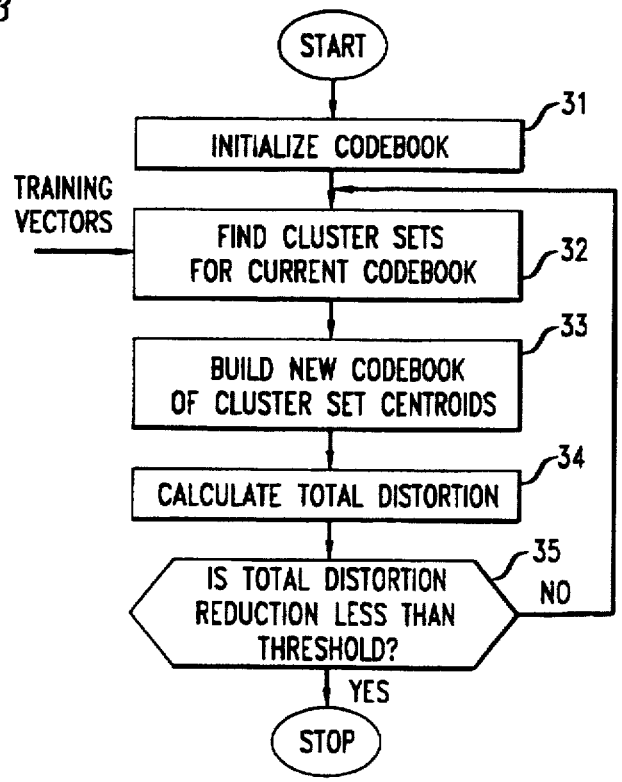
FIG. 3 shows a flow diagram of an illustrative codebook generator of the illustrative database generation process of FIG. 1.

FIG. 3 shows an illustrative flow diagram of the codebook generation process as may be performed by codebook generator 25 of the illustrative training procedure of FIG. 1. As explained above, the end result of the process of FIG. 1, which is advantageously performed for each person whose face is to be represented in the database, is to generate a codebook for a given person based on once or more training images containing his or her face. Thus, a codebook, $C^p$, is to be generated for each person, $p=1,2, \ldots, N$, where $N$ is the number of people (i.e., faces) in the database. Each codebook consists of a plurality of codevectors, $y_i$, where $i=1,2, \ldots, M$, and where $M$ is the size of each codebook (i.e., the number of codevectors contained therein). Illustratively, $M$ may be equal to 64. Each codevector consists of L values (i.e., DCT coefficients), as described above. Illustratively, the blocks may be of size 8×8 and L may be 8.

The illustrative procedure shown in FIG. 3 comprises an iterative process that generates a codebook by repeatedly matching the training vectors to a sequence of "intermediate" codebooks, $C^p_0, C^p_1, \ldots, C^p_m, \ldots$, modifying the codebook on each iteration (i.e., replacing codebook $C^p_m$ with improved codebook $C^p_{m+1}$), until a terminating criterion is met. The codebook which results from the final iteration then advantageously becomes the codebook which is used to represent the particular individual's face in the database.

Specifically, the illustrative procedure of FIG. 3 begins with step 31 which initializes the codebook to be used in the first iteration, $C^p_0$, to a random set of codevectors. These randomly chosen codevectors may, for example, comprise the first M vectors from the training set, or, alternatively, they may be chosen by generating random values therefor. Then, in each iteration, m, step 32 uses the (entire) set of training vectors to form "cluster sets," familiar to those skilled in the art. In particular, each training vector, $x_j$, where $j=1,2, \ldots, J$, is matched against each codevector $y^p_i$, where $i=1,2, \ldots, M$, in codebook $C^p_m$, computing an error function, $d(x_j, y^p_i)$, therefor. As a result of this matching, each training vector, $x_j$, may be assigned to a cluster set, $R_i$, associated with a corresponding one of the codevectors $y_i$, such that $$R_i = \{x : d(x, y^p_i) < d(x, y^p_k) \text{ for all } k \neq i\}$$

That is, each cluster set, $R_i$, consists of all the training vectors, x, for which the error i.e., the difference) between the training vector x and the i'th codevector, $y^p_i$, is less than the error between the training vector x and any other codevector in the codebook. Put another way, each training vector is assigned to the cluster associated with the codevector in the current codebook to which it is "closest," as determined by the error function, d(x,y). The error function d(x,y) may be any appropriate error metric. For example, d(x,y) may be the conventional mean square error (mse) metric, familiar to those of ordinary skill in the art.

In step 33, a new codebook, $C^p_{m+1}$, is developed for use in the next iteration based on the cluster sets which resulted from the analysis of step 32. In particular, for each cluster set, $R_i$, the centroid of the set (i.e., an n-dimensional weighted mean of the individual vectors in the set) is computed. Then the new codebook (for the next iteration) is constructed so as to comprise the set of computed centroids, cent($R_i$), for each $i=1,2, \ldots, M$. Note that if the mean squared error is used as the error metric, the centroid reduces to the arithmetic average. That is, $$\text{cent}(R_i) = \frac{1}{\|R_i\|} \sum_{j=1}^{\|R_i\|} x_j$$

for $R_i = x_j$, where $j=1,2, \ldots, \|R_i\|$, and where $\|R_i\|$ is the cardinality (i.e., the number of elements) of the set $R_i$.

In step 34, a total distortion measure for the given iteration, $D_m$, is calculated based on the distance between each of the training vectors and the centroid to which it clusters. That is, $$D_m = \Sigma d(x_j, \text{cent}(R_i)),$$

where the summation is performed over all $j=1,2, \ldots, J$ (i.e., over all training vectors). In this manner, $D_m$ comprises a measure of accuracy with which codebook $C^p_m$ is able to code the given set of training vectors. Finally, decision 35 computes the difference between the computed distortion measure ($D_m$) and the distortion measure computed for the previous iteration ($D_{m-1}$), in order to measure the degree of improvement in the quality of the codebooks from the previous iteration to the current one. If this difference is less than a predetermined threshold, $T_D$, the iteration may be advantageously terminated, since the improvement in codebook quality which is likely to be gained by performing additional iterations is small.

Figure 2:
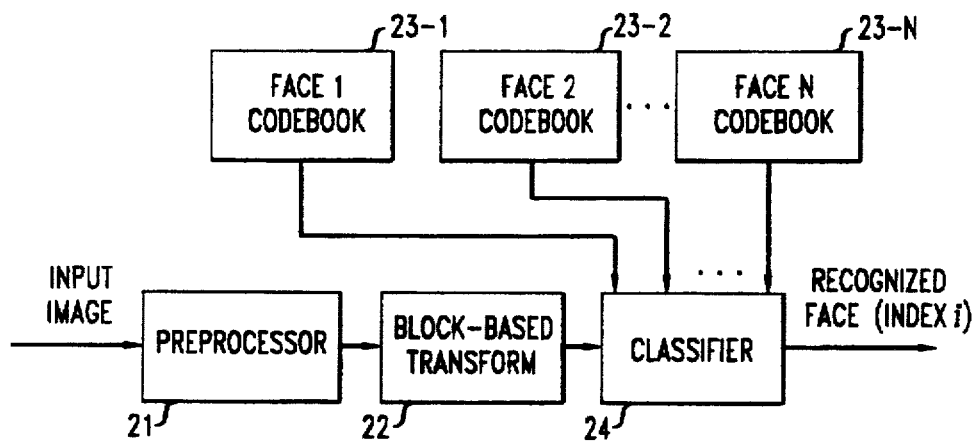
FIG. 2 shows an overview of a face recognition process in accordance with an illustrative embodiment of the present invention.

Once a database of codebooks representing known faces has been generated, face recognition may be performed in accordance with the principles of the present invention based on the set of codebooks contained in the database. FIG. 2 shows an overview of a face recognition process in accordance with an illustrative embodiment of the present invention. Given a database of codebooks (e.g., codebooks 23-1, 23-2, ..., 23-N), as generated, for example, with use of the illustrative procedures of FIGS. 1 and 3, the illustrative embodiment as shown in FIG. 2 may be used to identify (or to verify the identity of) a person's face comprised in an input image signal.

First, in an identical manner to that of the illustrative codebook generation process of FIG. 1, preprocessor 21 extracts the region of interest (i.e., the face) from the input image, and normalizes the scale thereof. Thus, all further processing can be advantageously performed on the face (and only the face), and all faces presented to the system will be of the same scale (i.e., size). Again, the preprocessing performed by preprocessor 21 is conventional and well known to those skilled in the art.

After the preprocessing has been completed, and again in an identical manner to that of the illustrative codebook generation process of FIG. 1, the extracted portion of the input image is decomposed into blocks, and a linear, block-based transform is performed on each block by transform 22. Again, the blocks may, for example, be of size 8×8, or, alternatively, of size 16×16, and they may be contiguous across the image space or, preferably, overlapping. The same transform (such as a DCT) as was used in the generation of codebooks 23-1 to 23-N is advantageously used in the face recognition process of FIG. 2 as well. Moreover, the same block size is advantageously used and the same set of (L) coefficients is advantageously provided.

Once the DCT input vectors have been provided by transform 22, classifier 24 is used to identify (or in the case of face verification, to verify) the face contained in the input image based on (known) face codebooks 23-1 to 23-N. Specifically, classifier 24 may, for example, determine which of the codebooks provides the best match to the input vectors which have been derived from the input image. In a face identification context, the face associated with the "best matching" codebook may then be identified as the most likely candidate. However, if the error metric upon which the comparisons are based (see, e.g., the discussion below) does not provide an "adequately" small total error value (e.g., below a predetermined threshold) for any of the known face codebooks (thereby indicating that no "sufficiently good" match was found), the system may not identify any of the known faces as the face in the input image. Rather, the system may simply determine that the person whose face is in the image is, in fact, none of the people for whom face data has been previously collected and stored in the database.

In a face verification context, the system may verify or reject (i.e., fail to verify) the claimed identity based on whether the claimed identity matches the known face codebook which is determined to be the best match with the face in the input image. Alternatively, the system may verify or reject the claimed identity based on whether the total error metric obtained when the input image is analyzed with respect to the particular codebook associated with the face of the claimed identity is "adequately" small, thereby indicating a sufficiently "good" match between the face in the input image and the face of the claimed identity.

Figure 5:
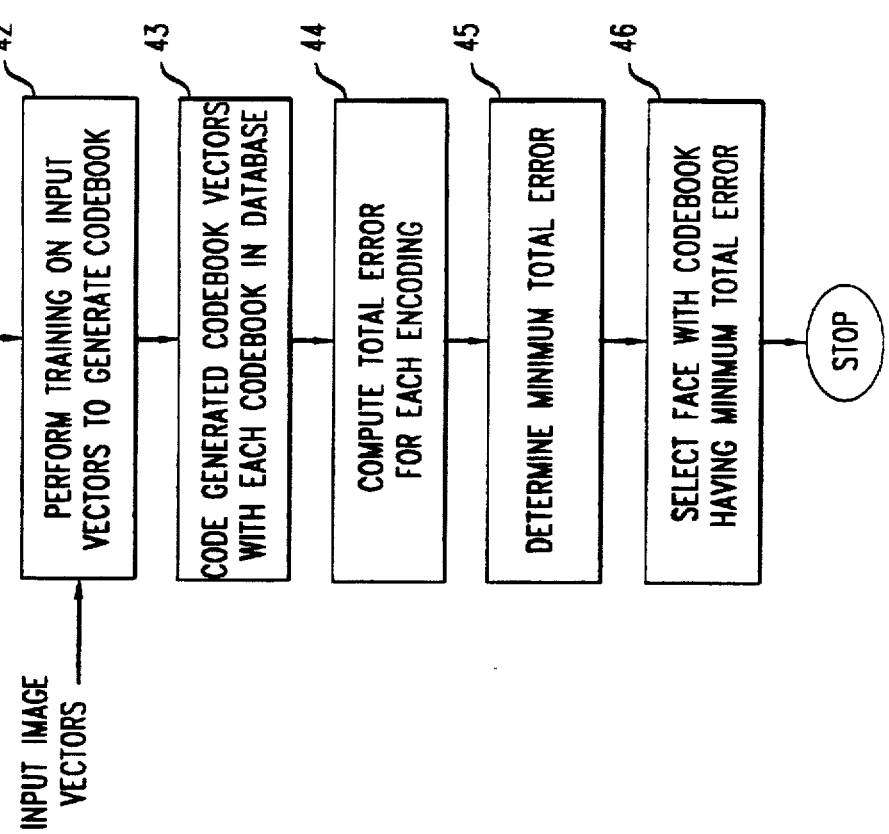
FIG. 5 shows a flow diagram of the classifier of the illustrative face recognition process of FIG. 2 in accordance with a second illustrative embodiment of the present invention.

In accordance with certain embodiments of the present invention, a determination of which known face codebook provides the best match to the face in the input image can be made in a number of different ways. For example, two illustrative embodiments of the operation of classifier 24 of the illustrative face recognition process of FIG. 2 are shown in FIGS. 4 and 5, respectively.

Figure 4:
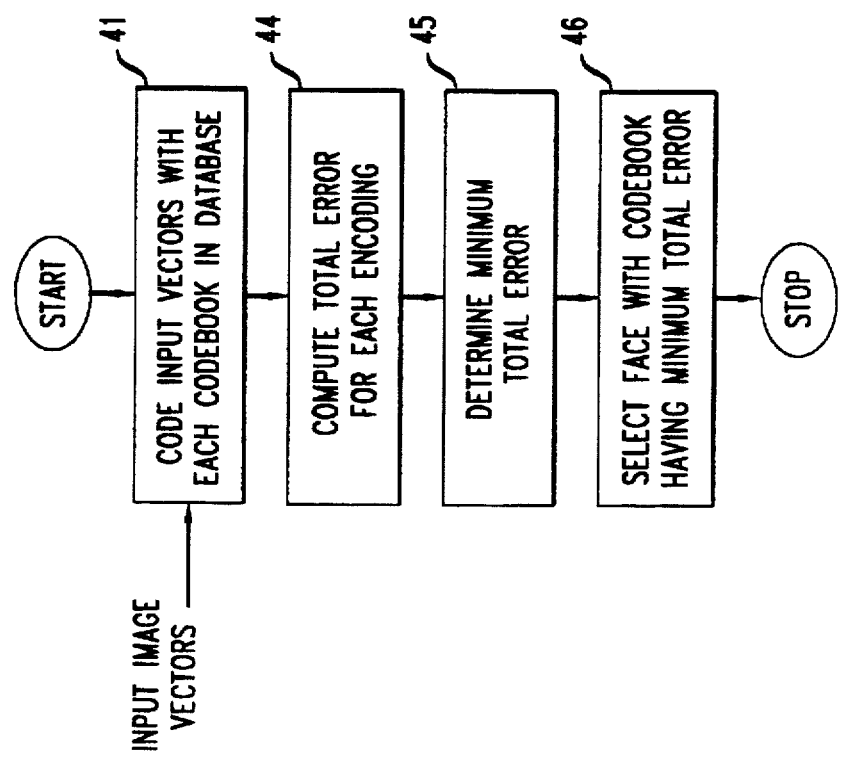
FIG. 4 shows a flow diagram of the classifier of the illustrative face recognition process of FIG. 2 in accordance with a first illustrative embodiment of the present invention.

FIG. 4 shows a flow diagram of the operation of classifier 24 of the illustrative face recognition process of FIG. 2 in accordance with a first illustrative embodiment of the present invention. In accordance with this embodiment, each of the known face codebooks are used to encode the input image vectors, and a total coding error is determined for each such encoding. Then, the encoding which results in the lowest total coding error is determined, and the face corresponding to the codebook used in that encoding is identified as the best match to the face in the input image.

Specifically, with reference to FIG. 4, the illustrative process begins with step 41, which performs a plurality of conventional VQ codebook encodings of the input image vectors, each such encoding performed with use of a different one of the known face codebooks (i.e., codebooks 23-1 through 23-N). In particular, and as is well known to those of ordinary skill in the art, each of these encodings consists of selecting one of the codevectors from the given codebook for each of the input image vectors, wherein the selection is made based on an error metric, such as, for example, a mean squared error. The selected codevector is the one that provides a "best match" to the input vector— that is, a codevector is selected for each input vector so as to advantageously minimize the error (i.e., the difference) between the input vector and the coding thereof (i.e., the selected codevector). Thus, for each codebook, $C^p$ (where $p=1,2,\ldots,N$), containing codevectors, $y^p_i$ (where $i=1,2,\ldots,M$), each input vector, $x_j$ (where $j=1,2,\ldots,J$), is compared to each of the codevectors to determine the one which results in a minimum error, given an error function $d(x,y)$. In particular, $d^p_{min}(x_j)$, representing the minimum error for a coding of input vector $x_j$ with use of codebook $C^p$ is determined for each input vector, $x_j$, as follows:

$$d^p_{min}(x_j) = \{d(x_j, y^p_i) : d(x_j, y^p_i) < d(x_j, y^p_k) \text{ for all } k \neq i, \text{ where } i,k=1,2,\ldots,M\}$$

After each of the encodings have been performed, step 44 of the illustrative procedure of FIG. 4 then calculates a total error, $D^p$, for each of the encodings (i.e., for all $p=1,2,\ldots,N$). These total errors are merely the sum of the individual coding errors, computed as follows:

$$D^p = \Sigma d^p_{min}(x_j)$$

where the summation is performed over all $j=1,2,\ldots,J$, and where the individual values of $d^p_{min}(x_j)$ are determined in the coding of each input vector, $x_j$, with use of the corresponding codebook, $C^p$ as shown above. Thus, these total error values represent the overall quality (i.e., accuracy) of the encodings performed with each of the codebooks. (Note, of course, that these total error values may alternatively and advantageously be computed during and as part of the encoding process itself, obviating the need for step 44 to be performed as a separate and distinct operation from the encodings performed in step 41.)

Completing the illustrative procedure of FIG. 4, step 45 determines the minimum total error value obtained over all of the encodings (i.e., the value of p for which $D^p$ is minimum), and step 46 selects the known face which is represented by the codebook which was used in the encoding which achieved the minimum total error (i.e., the best encoding). In this manner, the given face from the input image may be advantageously identified as being the known face in the database whose associated codebook results in this "best" encoding of the given face.

FIG. 5 shows a flow diagram of the operation of classifier 24 of the illustrative face recognition process of FIG. 2 in accordance with a second illustrative embodiment of the present invention. This illustrative embodiment provides a computationally simpler technique which results in only slightly lower performance than that of the illustrative procedure of FIG. 4. In particular, this second illustrative embodiment generates a codebook for the input image, and then compares this codebook to each of the known face codebooks in order to determine the "best match." Again, as in the illustrative procedure of FIG. 4, the lowest total error value is deemed to be indicative of the best match. However, the difference between the illustrative procedures of FIGS. 4 and 5 is that in the procedure of FIG. 5, rather than coding each of the (J) input vectors (which may, for example, require the coding of thousands of vectors), step 42 produces a codebook, illustratively containing only M (e.g., 64) codevectors, therefrom. Then, this more limited set of vectors (i.e., the M codevectors rather than the J input vectors, where, typically, J>>M) are encoded with use of each of the N codebooks (step 43), and the total errors obtained from each of these (simpler) encodings are used (in steps 44-46) to select the known face represented by the codebook having the minimum total error.

Specifically, the codebook generation of step 42 may comprise essentially the same procedure as that illustratively used for generating the known face codebooks as shown in FIG. 3. In this case, however, the illustrative training procedure of FIG. 3 is applied to the input image data, rather than to training image data. (Note that there is typically only one image from which the input image vectors are obtained, rather than the potentially many images from which training image vectors may be advantageously obtained.) The advantage of the use of the illustrative procedure of FIG. 5 instead of the illustrative procedure of FIG. 4, therefore, is that of having to compare only M (input image derived) codevectors to M (training image derived) codevectors for each of N codebooks, rather than having to compare J (input image derived) vectors to M (training image derived) codevectors for each of the N codebooks. Since, typically, J>>M, this may advantageously result in significant computational savings. Again, the error metric used may be a mean squared error, or it may be any other error metric familiar to those of ordinary skill in the art.

Although a number of specific embodiments of this invention have been shown and described herein, it is to be understood that these embodiments are merely illustrative of the many possible specific arrangements which can be devised in application of the principles of the invention. For example, although the description above has been focused on the recognition of human faces, it will be obvious to those skilled in the art that the techniques of the present invention may be applied to any general image recognition problem, wherein a given object is matched to one of a plurality of known objects, representations of which are stored in a database. In addition, although the embodiments of the present invention described above employ a mean squared error metric for measuring the difference between, for example, input vectors and codevectors, alternative embodiments may use other error metrics, including, for example, perceptual metrics which incorporate perceptual criterion. Such perceptual metrics are familiar to those skilled in the art. Numerous and varied other arrangements can also be devised in accordance with the principles of the present invention by those of ordinary skill in the art without departing from the spirit and scope of the invention.

We claim:

1. A method of matching a given object comprised in an input image signal to one of a plurality of known objects, a representation of each of the known objects having been stored in a database and comprising a codebook corresponding thereto, each codebook comprising a plurality of codevectors having been generated based on one or more corresponding training image signals comprising the corresponding known object, the method comprising the steps of:

decomposing a portion of the input image signal which includes the given object into a plurality of blocks;

generating a plurality of input vectors corresponding to the plurality of blocks, each input vector based on the block corresponding thereto; and matching the given object to one of the known objects based on one or more of the input vectors and on one or more of the codevectors comprised in one or more of the codebooks corresponding to the known objects, wherein the step of matching the given object to the one of the known objects comprises:

generating a codebook corresponding to the given object based on one or more of the input vectors;

comparing the codebook corresponding to the given object with one or more of the codebooks corresponding to the known objects; and matching the given object to the one of the known objects based on the comparison of the codebook corresponding to the given object with the codebooks corresponding to the known objects.

2. The method of claim 1 wherein the step of comparing the codebook corresponding to the given object with the codebooks corresponding to the known objects comprises computing a mean squared error for each comparison.

3. The method of claim 2 further comprising the step of determining a minimum mean squared error from the computed mean squared errors, and wherein the step of matching the given object to the one of the known objects comprises selecting the known object which corresponds to a codebook which, when compared to the codebook corresponding to the given object, resulted in the minimum mean squared error.

4. The method of claim 1 wherein the step of generating the input vectors comprises performing a linear transform oil the blocks and generating the input vectors based on the transformed blocks.

5. The method of claim 4 wherein the linear transform comprises a Discrete Cosine Transform.

6. The method of claim 1 wherein the codebooks corresponding to the known objects comprise vector quantization codebooks.

7. The method of claim 1 wherein the codevectors comprised in the codebooks corresponding to the known objects were generated from the one or more corresponding training image signals with use of a k-means clustering technique.

8. The method of claim 1 further comprising the step of identifying the given object as the known object which is matched to the given object.

9. The method of claim 1 further comprising the step of verifying that a claimed identification of the given object comprises the known object which is matched to the given object.

10. The method of claim 1 wherein the given object and each of the known objects comprises a human face.

11. A system for matching a given object comprised in an input image signal to one of a plurality of known objects, a representation of each of the known objects having been stored in a database and comprising a codebook corresponding thereto, each codebook comprising a plurality of codevectors having been generated based on one or more corresponding training image signals comprising the corresponding known object, the system comprising:

means for decomposing a portion of the input image signal which includes the given object into a plurality of blocks;

means for generating a plurality of input vectors corresponding to the plurality of blocks, each input vector based on the block corresponding thereto;

means for matching the given object to one of the known objects based on one or more of the input vectors and on one or more of the codevectors comprised in one or more of the codebooks corresponding to the known objects, wherein the means for matching the given object to the one of the known objects comprises:

means for generating a codebook corresponding to the given object based on one or more of the input vectors;

a comparator which compares the codebook corresponding to the given object with one or more of the codebooks corresponding to the known objects; and means for matching the given object to the one of the known objects based on the comparison of the codebook corresponding to the given object with the codebooks corresponding to the known objects.

12. The system of claim 11 wherein the comparator computes a mean squared error for each comparison.

13. The system of claim 12 further comprising means for determining a minimum mean squared error from the computed mean squared errors, and wherein the means for matching the given object to the one of the known objects comprises a selector which selects the known object which corresponds to a codebook which, when compared to the codebook corresponding to the given object, resulted in the minimum mean squared error.

14. The system of claim 11 wherein the means for generating the codebook corresponding to the given object comprises means for performing a k-means clustering technique.

15. The system of claim 11 wherein the means for generating the input vectors comprises means for performing a linear transform on the blocks and means for generating the input vectors based on the transformed blocks.

16. The system of claim 11 further comprising means for identifying the given object as the known object which is matched to the given object.

17. The system of claim 11 further comprising means for verifying that a claimed identification of the given object comprises the known object which is matched to the given object.

18. The system of claim 11 wherein the given object and each of the known objects comprises a human face.

* * * * *